United States Patent
Field

(10) Patent No.: US 8,236,147 B2
(45) Date of Patent: Aug. 7, 2012

(54) TUBULAR ELECTROLYSIS CELL AND CORRESPONDING METHOD

(75) Inventor: Bruce F. Field, Golden Valley, MN (US)

(73) Assignee: Tennant Company, Minneapolis, MN (US)

( * ) Notice: Subject to any disclaimer, the term of this patent is extended or adjusted under 35 U.S.C. 154(b) by 578 days.

(21) Appl. No.: 12/488,360

(22) Filed: Jun. 19, 2009

(65) Prior Publication Data

US 2009/0314659 A1 Dec. 24, 2009

Related U.S. Application Data

(60) Provisional application No. 61/074,059, filed on Jun. 19, 2008, provisional application No. 61/077,001, filed on Jun. 30, 2008, provisional application No. 61/077,005, filed on Jun. 30, 2008, provisional application No. 61/084,460, filed on Jul. 29, 2008, provisional application No. 61/083,046, filed on Jul. 23, 2008.

(51) Int. Cl.
  *C25B 9/00* (2006.01)
  *C25B 9/06* (2006.01)
(52) U.S. Cl. ............... 204/260; 204/272; 205/742
(58) Field of Classification Search .............. 204/260, 204/272; 205/742
  See application file for complete search history.

(56) References Cited

U.S. PATENT DOCUMENTS

| | | | | |
|---|---|---|---|---|
| 3,859,195 A | 1/1975 | Williams | ...................... | 204/272 |
| 3,897,320 A | 7/1975 | Cook, Jr. | .......................... | 204/95 |
| 3,933,614 A | 1/1976 | Bunn, Jr. | ........................ | 204/266 |
| 4,018,658 A | 4/1977 | Alfin et al. | ..................... | 204/109 |
| 4,099,489 A | 7/1978 | Bradley | ........................... | 123/3 |
| 4,105,528 A | 8/1978 | Hasebe | ........................ | 204/237 |
| 4,108,052 A | 8/1978 | Cunningham | .................. | 99/275 |
| 4,121,543 A | 10/1978 | Hicks, Jr. et al. | ................. | 123/3 |
| 4,129,493 A * | 12/1978 | Tighe et al. | .................... | 204/263 |
| 4,154,578 A | 5/1979 | Bane | ................................. | 8/137 |
| 4,244,079 A | 1/1981 | Bane | ............................... | 15/321 |
| 4,324,635 A | 4/1982 | Sweeney | ....................... | 204/266 |
| 4,374,711 A | 2/1983 | Ogawa | ........................... | 204/98 |
| 4,405,418 A | 9/1983 | Takemura | ....................... | 204/95 |
| 4,502,929 A | 3/1985 | Stewart et al. | ............... | 204/147 |
| 4,574,037 A | 3/1986 | Samejima et al. | ............. | 204/98 |
| 4,603,167 A | 7/1986 | Mahalek et al. | .............. | 524/706 |
| 4,630,167 A | 12/1986 | Huggins | ...................... | 361/213 |

(Continued)

FOREIGN PATENT DOCUMENTS

AU 732602 4/2001

(Continued)

OTHER PUBLICATIONS

Office Action from the United States Patent and Trademark Office for U.S. Appl. No. 11/655,359, dated Nov. 13, 2009.

(Continued)

*Primary Examiner* — Keith Hendricks
*Assistant Examiner* — Steven A. Friday
(74) *Attorney, Agent, or Firm* — David D. Brush; Westman, Champlin & Kelly, P.A.

(57) ABSTRACT

An electrolysis cell is provided, which includes an inlet, an outlet, and coaxial, cylindrical inner and outer electrodes. A cylindrical ion-selective membrane is located between the inner and outer electrodes and forms respective first and second electrolysis reaction chambers on opposing sides of the membrane. Fluid flow paths along the first and second chambers join together as a combined inlet flow path through the inlet and a combined outlet flow path through the outlet.

16 Claims, 8 Drawing Sheets

U.S. PATENT DOCUMENTS

| | | | | |
|---|---|---|---|---|
| 4,663,091 A | 5/1987 | Seo | 261/72.1 |
| 4,670,113 A | 6/1987 | Lewis | 204/80 |
| 4,676,882 A | 6/1987 | Okazaki | 204/260 |
| 4,687,558 A | 8/1987 | Justice et al. | 204/59 |
| 4,705,191 A | 11/1987 | Itzel et al. | 222/80 |
| 4,734,176 A | 3/1988 | Zemba, Jr. et al. | 204/149 |
| 4,810,344 A | 3/1989 | Okazaki | 204/228 |
| 4,832,230 A | 5/1989 | Janowitz | 222/80 |
| 4,875,988 A | 10/1989 | Aragon | 204/265 |
| 4,956,071 A | 9/1990 | Giuffrida et al. | 204/301 |
| 5,186,860 A | 2/1993 | Joyce, Jr. et al. | 252/500 |
| 5,250,161 A | 10/1993 | Chin et al. | 204/131 |
| 5,292,406 A | 3/1994 | Wanngard et al. | 204/95 |
| 5,316,646 A | 5/1994 | Arai | 204/306 |
| 5,320,718 A | 6/1994 | Molter et al. | 204/101 |
| 5,378,339 A | 1/1995 | Aoki et al. | 204/260 |
| 5,536,389 A | 7/1996 | La Naour et al. | 205/688 |
| 5,590,439 A | 1/1997 | Alazet | 15/320 |
| 5,632,870 A | 5/1997 | Kucherov | 204/241 |
| 5,665,212 A | 9/1997 | Zhong et al. | 304/297 |
| 5,733,434 A | 3/1998 | Harada et al. | 205/746 |
| 5,762,779 A | 6/1998 | Shiramizu et al. | 205/746 |
| 5,766,438 A | 6/1998 | Ishibashi et al. | 204/520 |
| 5,779,891 A | 7/1998 | Andelman | 210/198.2 |
| 5,815,869 A | 10/1998 | Hopkins | 8/158 |
| 5,824,200 A | 10/1998 | Kitajima et al. | 204/265 |
| 5,853,562 A | 12/1998 | Eki et al. |
| 5,858,201 A | 1/1999 | Otsuka et al. | 205/701 |
| 5,858,202 A | 1/1999 | Nakamura | 205/746 |
| 5,928,505 A | 7/1999 | Inakagata et al. | 210/91 |
| 5,931,859 A | 8/1999 | Burke | 607/66 |
| 5,997,717 A | 12/1999 | Miyashita et al. | 205/466 |
| 6,016,973 A | 1/2000 | Thompson et al. | 239/304 |
| 6,032,655 A | 3/2000 | Kavonius | 123/538 |
| 6,059,941 A | 5/2000 | Bryson et al. | 204/263 |
| 6,088,211 A | 7/2000 | Pitel | 361/212 |
| 6,101,671 A | 8/2000 | Wright et al. | 15/365 |
| 6,110,353 A | 8/2000 | Hough | 205/701 |
| 6,132,572 A | 10/2000 | Kim | 204/253 |
| 6,200,434 B1 | 3/2001 | Shinjo et al. | 204/230.2 |
| 6,231,747 B1 | 5/2001 | Fukuzuka et al. | 205/500 |
| 6,315,886 B1 | 11/2001 | Zappi et al. | 205/701 |
| 6,375,827 B1 | 4/2002 | Kurosu et al. | 205/687 |
| 6,379,628 B2 | 4/2002 | de Jong et al. | 422/186.04 |
| 6,409,895 B1 * | 6/2002 | Ponzano | 204/260 |
| 6,425,958 B1 | 7/2002 | Giddings et al. | 134/21 |
| 6,488,016 B2 | 12/2002 | Kavonius | 123/538 |
| 6,502,766 B1 | 1/2003 | Streutker et al. | 239/332 |
| 6,585,827 B2 | 7/2003 | Field et al. | 134/6 |
| 6,638,364 B2 | 10/2003 | Harkins et al. | 134/21 |
| 6,652,719 B1 | 11/2003 | Tseng | 204/257 |
| 6,689,262 B2 | 2/2004 | Senkiw | 204/278.5 |
| 6,703,785 B2 | 3/2004 | Aiki et al. | 315/111.81 |
| 6,719,891 B2 | 4/2004 | Ruhr et al. | 205/500 |
| 6,735,812 B2 | 5/2004 | Hekman et al. | 15/320 |
| 6,842,940 B2 | 1/2005 | Christopher et al. | 15/320 |
| 6,855,233 B2 | 2/2005 | Sawada | 204/263 |
| 6,878,287 B1 | 4/2005 | Marais | 210/748 |
| 6,921,743 B2 | 7/2005 | Scheper et al. | 510/220 |
| 6,926,819 B2 * | 8/2005 | Nakamura et al. | 204/272 |
| 6,964,739 B2 | 11/2005 | Boyd et al. | 210/167 |
| 6,974,561 B1 | 12/2005 | Thomason | 422/186.29 |
| 7,008,523 B2 | 3/2006 | Herrington | 205/701 |
| 7,011,739 B2 | 3/2006 | Harkins et al. | 205/701 |
| 7,059,013 B2 | 6/2006 | Wydra et al. | 15/345 |
| 7,156,962 B2 | 1/2007 | Koizumi et al. | 204/292 |
| 7,160,472 B2 | 1/2007 | Van Vliet et al. | 201/748 |
| 7,226,542 B2 | 6/2007 | Zemel et al. | 210/748 |
| 7,238,272 B2 | 7/2007 | Sano | 205/701 |
| 7,836,543 B2 | 11/2010 | Field et al. | 15/320 |
| 7,891,046 B2 | 2/2011 | Field et al. | 15/320 |
| 8,007,654 B2 | 8/2011 | Field et al. | 205/701 |
| 8,012,339 B2 | 9/2011 | Field | 205/701 |
| 8,012,340 B2 | 9/2011 | Field et al. | 205/746 |
| 8,025,786 B2 | 9/2011 | Field et al. | 205/746 |
| 8,025,787 B2 | 9/2011 | Field et al. | 205/746 |
| 2001/0002500 A1 | 6/2001 | Kasen et al. | 15/320 |
| 2001/0112314 | 11/2001 | Ko | 15/320 |
| 2002/0023847 A1 | 2/2002 | Natsume | 205/687 |
| 2002/0027070 A1 | 3/2002 | Oyokota et al. | 204/257 |
| 2002/0032141 A1 | 3/2002 | Harkins | 510/253 |
| 2002/0074237 A1 | 6/2002 | Takesako et al. | 205/628 |
| 2002/0112314 A1 | 8/2002 | Harkins | 15/321 |
| 2002/0185423 A1 | 12/2002 | Boyd et al. | 610/167 |
| 2003/0001439 A1 | 1/2003 | Schur | 310/11 |
| 2003/0062068 A1 | 4/2003 | Ko et al. | 134/28 |
| 2003/0070919 A1 | 4/2003 | Gilmore | 204/275.1 |
| 2003/0102270 A1 | 6/2003 | Schoeberl | 210/748 |
| 2003/0159230 A1 | 8/2003 | Oh | 15/320 |
| 2003/0159231 A1 | 8/2003 | Oh | 15/320 |
| 2003/0159233 A1 | 8/2003 | Oh | 15/321 |
| 2003/0164306 A1 | 9/2003 | Senkiw | 205/633 |
| 2003/0213505 A1 | 11/2003 | Price et al. | 134/25.2 |
| 2004/0011665 A1 | 1/2004 | Koizumi et al. | 205/626 |
| 2004/0012913 A1 | 1/2004 | Andelman | 361/503 |
| 2004/0037737 A1 | 2/2004 | Marais et al. | 422/28 |
| 2004/0069611 A1 | 4/2004 | MacGregor | 204/157.15 |
| 2004/0094432 A1 | 5/2004 | Neel et al. | 205/777.5 |
| 2004/0112763 A1 | 6/2004 | Itoh et al. | 205/746 |
| 2004/0166019 A1 | 8/2004 | Schultheiss | 422/22 |
| 2004/0168933 A1 | 9/2004 | Inoue | 205/746 |
| 2004/0226123 A1 | 11/2004 | Policicchio et al. | 15/115 |
| 2004/0250323 A1 | 12/2004 | Arai et al. | D32/1 |
| 2004/0256247 A1 | 12/2004 | Carson et al. | 205/688 |
| 2005/0103644 A1 | 5/2005 | Wilkins et al. | 205/751 |
| 2005/0121334 A1 | 6/2005 | Sumita | 205/628 |
| 2005/0126928 A1 | 6/2005 | Hung et al. | 205/746 |
| 2005/0136520 A1 | 6/2005 | Kinley et al. | 435/155 |
| 2005/0139239 A1 | 6/2005 | Prae | 134/34 |
| 2005/0139808 A1 | 6/2005 | Alimi | 252/187.26 |
| 2005/0194261 A1 | 9/2005 | Hadia | 205/701 |
| 2005/0244556 A1 | 11/2005 | Karren | 426/335 |
| 2006/0037869 A1 | 2/2006 | Mitchke | 205/701 |
| 2006/0076248 A1 | 4/2006 | Kindred | 205/743 |
| 2006/0162735 A1 | 7/2006 | Thiebaut | 132/200 |
| 2006/0169575 A1 | 8/2006 | Sumita | 204/164 |
| 2006/0231503 A1 | 10/2006 | Flettner | 210/748 |
| 2006/0263240 A1 | 11/2006 | Hopkins | 422/28 |
| 2006/0280664 A1 | 12/2006 | Huang et al. | 422/292 |
| 2007/0023273 A1 | 2/2007 | Kitaori et al. | 204/164 |
| 2007/0037267 A1 | 2/2007 | Lewis et al. | 435/161 |
| 2007/0141434 A1 | 6/2007 | Joshi et al. | 429/34 |
| 2007/0170072 A1 | 7/2007 | Shyu | 205/701 |
| 2007/0186367 A1 | 8/2007 | Field et al. | 15/320 |
| 2007/0186368 A1 | 8/2007 | Field et al. | 15/320 |
| 2007/0186369 A1 | 8/2007 | Field et al. | 15/320 |
| 2007/0186954 A1 | 8/2007 | Field et al. | 134/6 |
| 2007/0186957 A1 | 8/2007 | Field et al. | 134/18 |
| 2007/0186958 A1 | 8/2007 | Field et al. | 134/21 |
| 2007/0187261 A1 | 8/2007 | Field et al. | 205/742 |
| 2007/0187262 A1 | 8/2007 | Field et al. | 205/742 |
| 2007/0187263 A1 | 8/2007 | Field et al. | 205/742 |
| 2007/0272549 A1 | 11/2007 | Davis et al. | 204/260 |
| 2008/0264778 A1 | 10/2008 | Joshi et al. | 204/232 |
| 2009/0008268 A1 | 1/2009 | Salathe et al. | 205/701 |
| 2009/0127128 A1 | 5/2009 | Kitaori et al. | 205/464 |
| 2009/0148342 A1 | 6/2009 | Bromberg et al. | 422/37 |
| 2009/0162505 A1 | 6/2009 | Kriebel et al. | 426/335 |
| 2009/0184186 A1 | 7/2009 | Suda et al. | 239/690 |
| 2009/0212132 A1 | 8/2009 | Simmonds et al. | 239/289 |
| 2009/0235431 A1 | 9/2009 | Gosebruch et al. | 15/320 |
| 2010/0189805 A1 | 7/2010 | Saefkow et al. | 424/600 |
| 2010/0192987 A1 | 8/2010 | Steffen | 134/34 |

FOREIGN PATENT DOCUMENTS

| | | |
|---|---|---|
| CN | 1845877 | 10/2006 |
| CN | 200977495 | 11/2007 |
| DE | 2951993 | 7/1981 |
| DE | 8430251 | 6/1984 |
| DE | 4406320 | 8/1995 |
| DE | 19752174 | 7/1998 |
| DE | 20210562 | 10/2002 |
| DE | 202004010572 | 11/2004 |
| EP | 0041373 | 12/1981 |
| EP | 0104345 | 4/1984 |
| EP | 0199493 | 10/1986 |
| EP | 0438902 | 7/1991 |

| | | |
|---|---|---|
| EP | 0636581 | 2/1995 |
| EP | 0663176 | 7/1995 |
| EP | 0672623 | 9/1995 |
| EP | 0674026 | 9/1995 |
| EP | 0740329 | 10/1996 |
| EP | 0761235 | 3/1997 |
| EP | 1000554 | 5/2000 |
| EP | 1008662 | 6/2000 |
| EP | 1162176 | 12/2001 |
| EP | 1188719 | 3/2002 |
| EP | 1293481 | 3/2003 |
| EP | 1308421 | 5/2003 |
| EP | 1065170 | 1/2004 |
| EP | 1386995 | 2/2004 |
| EP | 1309519 | 9/2004 |
| EP | 1533041 | 5/2005 |
| EP | 1671560 | 6/2006 |
| EP | 1741676 | 1/2007 |
| EP | 1754804 | 2/2007 |
| EP | 1903128 | 3/2008 |
| EP | 1932809 | 6/2008 |
| EP | 1941912 | 7/2008 |
| EP | 1978142 | 10/2008 |
| EP | 2050378 | 4/2009 |
| EP | 2078700 | 7/2009 |
| EP | 2078701 | 7/2009 |
| FR | 2381835 | 9/1978 |
| FR | 2909370 | 6/2008 |
| GB | 611819 | 11/1948 |
| GB | 2149423 | 11/1983 |
| GB | 2141738 | 1/1985 |
| GB | 2298858 | 9/1996 |
| GB | 2381187 | 4/2003 |
| GB | 2393737 | 4/2004 |
| JP | 1111483 | 4/1989 |
| JP | 03157188 | 7/1991 |
| JP | 07233493 | 9/1995 |
| JP | 08112574 | 5/1996 |
| JP | 09075427 | 3/1997 |
| JP | 1997-174054 | 7/1997 |
| JP | 11090442 | 9/1997 |
| JP | 10057282 | 3/1998 |
| JP | 11010159 | 1/1999 |
| JP | 11057715 | 3/1999 |
| JP | 11128941 | 5/1999 |
| JP | 2000-079393 | 3/2000 |
| JP | 2002-102856 | 4/2002 |
| JP | 2003-062573 | 3/2003 |
| JP | 2003-181338 | 7/2003 |
| JP | 2003-261190 | 9/2003 |
| JP | 2003-3266073 | 9/2003 |
| JP | 2003-334557 | 11/2003 |
| JP | 2004-073914 | 3/2004 |
| JP | 2004-129954 | 4/2004 |
| JP | 2004-148108 | 5/2004 |
| JP | 2004-148109 | 5/2004 |
| JP | 2006-036341 | 9/2006 |
| JP | 2007-000402 | 1/2007 |
| JP | 2007-136356 | 6/2007 |
| JP | 2007-239041 | 9/2007 |
| KR | 2001-0096847 | 11/2001 |
| KR | 2002-0025023 | 11/2003 |
| KR | 2006-0007369 | 1/2006 |
| KR | 100599229 | 7/2006 |
| NL | 1012257 | 12/2000 |
| WO | 8606098 | 10/1986 |
| WO | 9640591 | 12/1995 |
| WO | 9818723 | 5/1998 |
| WO | 9846874 | 10/1998 |
| WO | 9908719 | 2/1999 |
| WO | 9963843 | 12/1999 |
| WO | 0015561 | 3/2000 |
| WO | 0118279 | 3/2001 |
| WO | 0127037 | 4/2001 |
| WO | 0214228 | 2/2002 |
| WO | 02066382 | 8/2002 |
| WO | 02102716 | 12/2002 |
| WO | 03009920 | 2/2003 |
| WO | 03022444 | 3/2003 |
| WO | 03040038 | 5/2003 |
| WO | 2004015172 | 2/2004 |
| WO | 2004079051 | 9/2004 |
| WO | 2004106242 | 12/2004 |
| WO | 2004108607 | 12/2004 |
| WO | 2005012186 | 2/2005 |
| WO | 2005014058 | 2/2005 |
| WO | 2005020780 | 3/2005 |
| WO | 2005079468 | 9/2005 |
| WO | 2005093129 | 10/2005 |
| WO | 2005094904 | 10/2005 |
| WO | 2005097350 | 10/2005 |
| WO | 2006124805 | 11/2006 |
| WO | 20070031779 | 3/2007 |
| WO | 2007092597 | 8/2007 |
| WO | 2007093395 | 8/2007 |
| WO | 2007095072 | 8/2007 |
| WO | 2007095074 | 8/2007 |
| WO | 2007138363 | 12/2007 |
| WO | 2007142693 | 12/2007 |
| WO | 2007145058 | 12/2007 |
| WO | 2007145385 | 12/2007 |
| WO | 2008032544 | 3/2008 |
| WO | 2008061546 | 5/2008 |
| WO | 2008131389 | 10/2008 |
| WO | 2009011841 | 1/2009 |
| WO | 2009039674 | 4/2009 |
| WO | 2009040407 | 4/2009 |
| WO | 2009046563 | 4/2009 |
| WO | 2009067838 | 6/2009 |
| WO | 2009155546 | 12/2009 |

OTHER PUBLICATIONS

Restriction Requirement from the United States Patent and Trademark Office for U.S. Appl. No. 11/655,385, dated Dec. 9, 2009.
Final Office Action from the United States Patent and Trademark Office for U.S. Appl. No. 11/655,390, dated Jan. 11, 2010.
Office Action from the United States Patent and Trademark Office for U.S. Appl. No. 11/655,378, dated Jan. 14, 2010.
Office Action from the United States Patent and Trademark Office for U.S. Appl. No. 11/655,385, dated Jan. 29, 2010.
Written Opinion dated Dec. 11, 2009 from International Application No. PCT/US2009/048008, filed Jun. 19, 2009.
Written Opinion dated Dec. 28, 2009 from International Application No. PCT/US2009/048009, filed Jun. 19, 2009.
International Search Report dated Dec. 11, 2009 for International Application No. PCT/US2009/048008, filed Jun. 19, 2009.
International Search Report dated Dec. 28, 2009 for International Application No. PCT/US2009/048009, filed Jun. 19, 2009.
Notice of Allowance from the United States Patent and Trademark Office for U.S. Appl. No. 11/655,359, dated Aug. 11, 2011.
Restriction Requirement from the United States Patent and Trademark Office for U.S. Appl. No. 12/481,115, dated Oct. 11, 2011.
Office Action from the United States Patent and Trademark Office for U.S. Appl. No. 11/655,365, dated Oct. 12, 2011.
Restriction Requirement from the United States Patent and Trademark Office for U.S. Appl. No. 12/552,508, dated Nov. 8, 2011.
Restriction Requirement from the United States Patent and Trademark Office for U.S. Appl. No. 12/481,115, dated Dec. 6, 2011.
Office Action from the United States Patent and Trademark Office for U.S. Appl. No. 12/481,098, dated Dec. 29, 2011.
Office Action from the United States Patent and Trademark Office for U.S. Appl. No. 12/552,508, dated Jan. 20, 2012.
Notice of Allowance from the United States Patent and Trademark Office for U.S. Appl. No. 11/655,365, dated Jan. 24, 2012.
Office Action from the United States Patent and Trademark Office for U.S. Appl. No. 12/481,115, dated Jan. 31, 2012.
Office Action from the United States Patent and Trademark Office for U.S. Appl. No. 12/245,213, dated Feb. 2, 2012.
Office Action from the United States Patent and Trademark Office for U.S. Appl. No. 12/488,368, dated Feb. 27, 2012.
Office Action from the United States Patent and Trademark Office for U.S. Appl. No. 12/488,301, dated Mar. 13, 2012.
Aoki et al., "Wafer Treatment Using Electrolysis-Ionized Water", 1994, Jpn. J. Appl. Phys. vol. 33, pp. 5686-5689.

Bluhm, Hans J. et al., "Disruption and Destruction of Biological Cells Using Strong Pulsed Electric Fields" Nachrichten, Karlsruhe, DE, vol. 3, Jan. 1, 2005, pp. 105-110.

Final Office Action from the United States Patent and Trademark Office for U.S. Appl. No. 11/655,378, dated Jul. 2, 2010.

Notice of Allowance from the United States Patent and Trademark Office for U.S. Appl. No. 11/655,385, dated Jul. 14, 2010.

Office Action from the United States Patent and Trademark Office for U.S. Appl. No. 11/655,390, dated Jul. 19, 2010.

Restriction/Election Requirement from the United States Patent and Trademark Office for U.S. Appl. No. 11/655,365, dated Aug. 17, 2010.

Office Action from the United States Patent and Trademark Office for U.S. Appl. No. 11/655,359, dated Aug. 18, 2010.

Office Action from the United States Patent and Trademark Office for U.S. Appl. No. 11/655,378, dated Sep. 9, 2010.

Office Action from the United States Patent and Trademark Office for U.S. Appl. No. 11/655,415, dated Sep. 29, 2010.

Office Action from the United States Patent and Trademark Office for U.S. Appl. No. 11/655,360, dated Sep. 30, 2010.

Office Action from the United States Patent and Trademark Office for U.S. Appl. No. 12/122,350, dated Sep. 30, 2010.

Office Action from the United States Patent and Trademark Office for U.S. Appl. No. 11/655,310, dated Oct. 1, 2010.

Office Action from the United States Patent and Trademark Office for U.S. Appl. No. 11/655,389, dated Oct. 1, 2010.

Office Action from the United States Patent and Trademark Office for U.S. Appl. No. 11/655,365, dated Dec. 3, 2010.

Notice of Allowance from the United States Patent and Trademark Office for U.S. Appl. No. 11/655,390, dated Jan. 6, 2011.

Final Office Action from the United States Patent and Trademark Office for U.S. Appl. No. 11/655,378, dated Jan. 25, 2011.

Office Action from the United States Patent and Trademark Office for U.S. Appl. No. 11/655,359, dated Feb. 3, 2011.

Notice of Allowance from the United States Patent and Trademark Office for U.S. Appl. No. 12/122,350, dated Mar. 16, 2011.

Notice of Allowance from the United States Patent and Trademark Office for U.S. Appl. No. 11/655,389, dated Mar. 17, 2011.

Notice of Allowance from the United States Patent and Trademark Office for U.S. Appl. No. 11/655,360, dated Mar. 18, 2011.

Notice of Allowance from the United States Patent and Trademark Office for U.S. Appl. No. 11/655,415, dated Mar. 23, 2011.

Notice of Allowance from the United States Patent and Trademark Office for U.S. Appl. No. 11/655,310, dated Mar. 23, 2011.

Notice of Allowability from the United States Patent and Trademark Office for U.S. Appl. No. 11/655,378, dated Apr. 28, 2011.

Notice of Allowance from the United States Patent and Trademark Office for U.S. Appl. No. 11/655,378, dated May 10, 2011.

JP-HC15022149.

"Fast-Foam Scrubbing Technology, The Safe Scrubbing Alternative,T5-Parts Manual," Tennant Company,www.tennantco.com, 2006.

"Fast-Foam Scrubbing Technology, The Safe Scrubbing Alternative, T5-Scrubber-Dryer Operator Manual," Tennant Company, www.tennantco.com, 2006.

"ECO Smarte—The Best Multiple Mineral Technology for Problem Well Water; The Best Chemical Reduction System for City Water Complete Bacteria and Scale Control," ECOsmarte® Planet Friendly, Inc., http://www.ecosmarte.com/sciencesummary.html, 1994, pp. 1-13.

"Krebs Engineers® Products," 2006 Krebs Engineers,http//www.krebs.com/about.php/ and http://www.krebs.com/products/php/product/20/CycloClean%AE+Modules, 2006, pp. 1-3.

"The Oxygenator Livelier Bait-Healthier fish," Aqua Innovations, Inc., aquainnovationsinc.com, published prior toJan. 19, 2007, pp. 1-2.

"JP102 Water Cell," Emco Tech Co., Ltd. of Goyang-City Kyungki-Do, South Korea, Oct. 18, 2006, pp. 1.

Mary Jones, "Richfield-Based EcoSmarte has Perfected a Natural- and Profitable-Approach to Water Purification,"Minnesota Technology, Inside Technology and Manufacturing Business, Fall 2005, pp. 1-3.

Office Action from the United States Patent and Trademark Office for U.S. Appl. No. 11/655,390, dated Jan. 19, 2007.

Office Action from the United States Patent and Trademark Office for U.S. Appl. No. 11/655,359, dated Mar. 19, 2009.

Restriction Requirement from the United States Patent and Trademark Office for U.S. Appl. No. 11/655,390, dated Apr. 10, 2009.

Office Action from the United States Patent and Trademark Office for U.S. Appl. No. 11/655,390, dated Jul. 16, 2009.

Written Opinion dated Oct. 22, 2009 from International Application No. PCT/US2009/047979, filed Jun. 19, 2009.

International Search Report dated Oct. 22, 2009 for International Application No. PCT/US2009/047979, filed Jun. 19, 2009.

"Conductive Polymers: Evaluation of Industrial Applications" Synthetic Metals, 55-57 (1993) 3623-3631 S. Roth et al.

Written Opinion dated Oct. 7, 2009 from International Application No. PCT/US2009/047971, filed Jun. 19, 2009.

Written Opinion dated Oct. 2, 2009 from International Application No. PCT/US2009/047958, filed Jun. 19, 2009.

Written Opinion dated Sep. 30, 2009 from International Application No. PCT/US2009/048005, filed Jun. 19, 2009.

International Search Report dated Oct. 7, 2009 for International Application No. PCT/US2009/047971, filed Jun. 19, 2009.

International Search Report dated Oct. 2, 2009 for International Application No. PCT/US2009-047958, filed Jun. 19, 2009.

International Search Report dated Sep. 30, 2009 for International Application No. PCT/US2009/048005, filed Jun. 19, 2009.

Office Action from the Mexican Patent Office dated May 23, 2012 for corresponding Mexican Patent Application No. MX/a/2010/014390.

Office Action from the Chinese Patent Office dated Apr. 27, 2012 for corresponding Chinese Patent Application No. 200980131962.8.

Office Action from the United States Patent and Trademark Office for U.S. Appl. No. 12/488,316, dated Apr. 9, 2012.

Final Office Action from the United States Patent and Trademark Office for U.S. Appl. No. 12/481,098, dated Apr. 17, 2012.

Office Action from the United States Patent and Trademark Office for U.S. Appl. No. 12/693,114, dated Apr. 19, 2012.

Office Action from the United States Patent and Trademark Office for U.S. Appl. No. 12/488,349, dated Apr. 24, 2012.

Final Office Action from the United States Patent and Trademark Office for U.S. Appl. No. 12/481,115, dated May 23, 2012.

Restriction Requirement from the United States Patent and Trademark Office for U.S. Appl. No. 12/872,157, dated May 24, 2012.

* cited by examiner

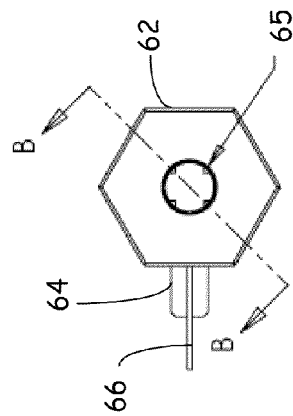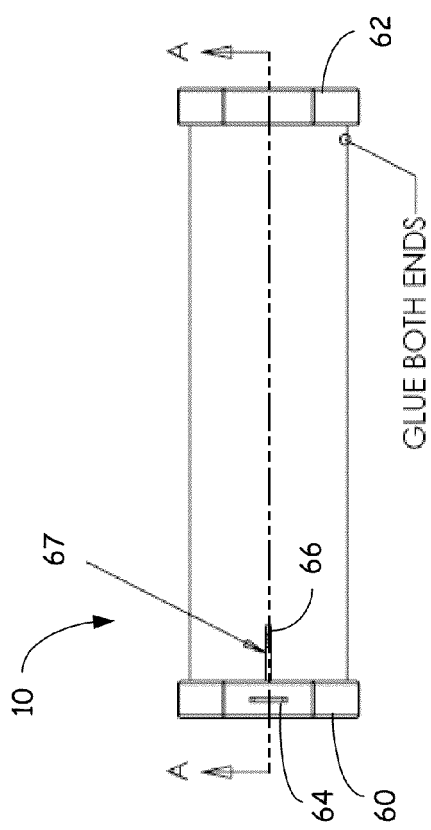

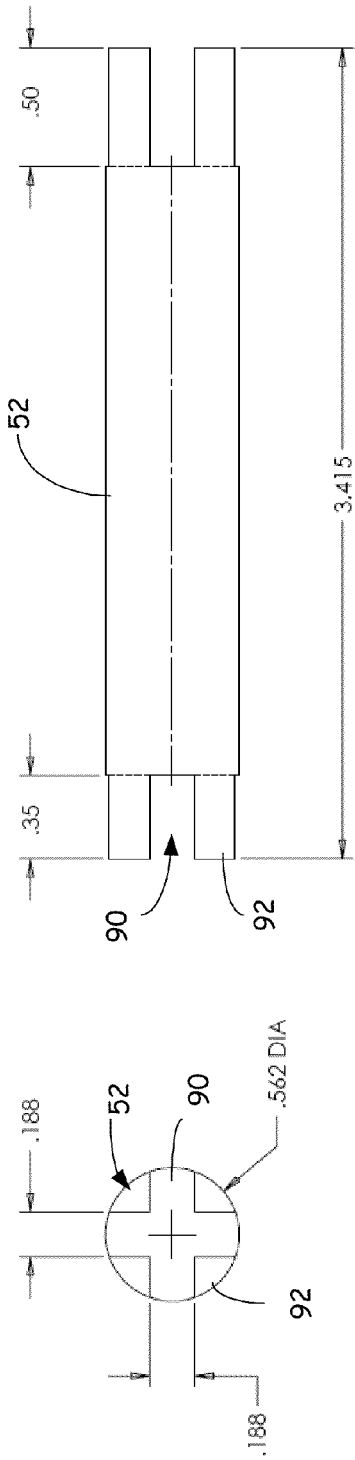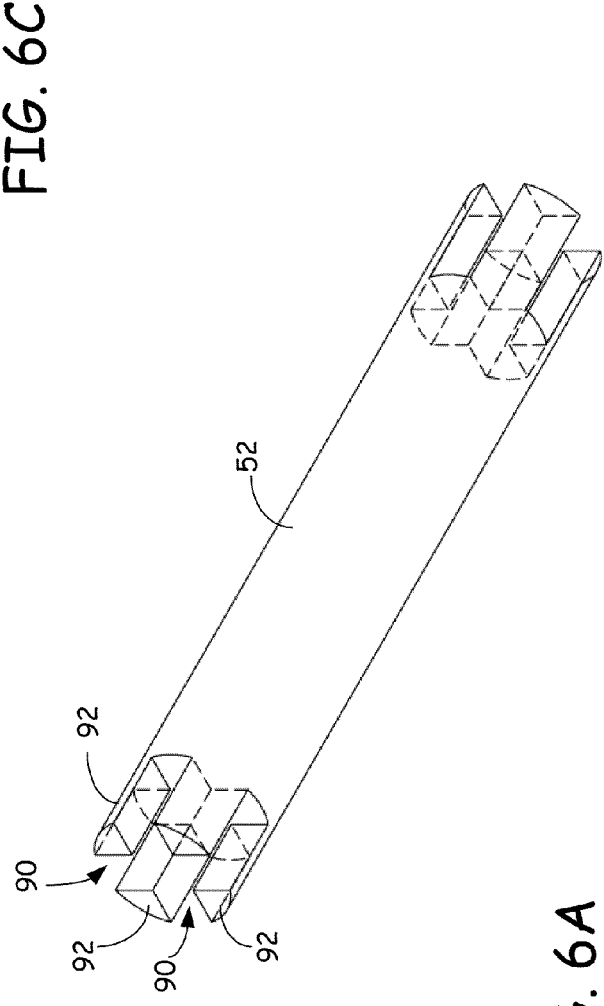
FIG. 6C
FIG. 6B
FIG. 6A

TUBULAR ELECTROLYSIS CELL AND CORRESPONDING METHOD

CROSS-REFERENCE TO RELATED APPLICATIONS

The present application is based on and claims the benefit of the following applications:

1) U.S. Provisional Patent Appln. No. 61/074,059, filed Jun. 19, 2008, entitled ELECTROLYSIS CELL HAVING CONDUCTIVE POLYMER ELECTRODES AND METHOD OF ELECTROLYSIS;
2) U.S. Provisional Patent Appln. No. 61/077,001, filed Jun. 30, 2008, entitled HAND-HELD SPRAY BOTTLE ELECTROLYSIS CELL AND DC-DC CONVERTER;
3) U.S. Provisional Patent Appln. No. 61/077,005, filed Jun. 30, 2008, entitled ELECTROLYSIS CELL HAVING ELECTRODES WITH VARIOUS-SIZED/SHAPED APERTURES;
4) U.S. Provisional Patent Appln. No. 61/083,046, filed Jul. 23, 2008, entitled ELECTROLYSIS DE-SCALING METHOD WITH CONSTANT OUTPUT; and
5) U.S. Provisional Patent Appln. No. 61/084,460, filed Jul. 29, 2008, entitled TUBULAR ELECTROLYSIS CELL AND CORRESPONDING METHOD; the contents of which are hereby incorporated by reference in their entirety.

BACKGROUND

Electrolysis cells are used in a variety of different applications for changing one or more characteristics of a fluid. For example, electrolysis cells have been used in cleaning/sanitizing applications, medical industries, and semiconductor manufacturing processes. Electrolysis cells have also been used in a variety of other applications and have had different configurations.

For cleaning/sanitizing applications, electrolysis cells are used to create anolyte electrochemically activated (EA) liquid and catholyte EA liquid. Anolyte EA liquids have known sanitizing properties, and catholyte EA liquids have known cleaning properties. Examples of cleaning and/or sanitizing systems are disclosed in Field et al. U.S. Publication No. 2007/0186368 A1, published Aug. 16, 2007.

SUMMARY

An aspect of the disclosure relates to an electrolysis cell, which includes an inlet, an outlet, and coaxial inner and outer electrodes An ion-selective membrane is located in a gap between the inner and outer electrodes and forms respective first and second electrolysis reaction chambers on opposing sides of the membrane. Fluid flow paths along the first and second chambers join together as a combined outlet flow path through the outlet.

In a particular embodiment of the disclosure, fluid flow paths along the first and second chambers also join together as a combined inlet flow path through the inlet.

Another aspect of the disclosure relates to a method of electrolyzing a liquid. The method includes passing the liquid through such an electrolysis cell and applying an energization voltage between the first and second electrodes.

BRIEF DESCRIPTION OF THE DRAWINGS

FIG. 3A is a top plan view of a specific example of the electrolysis cell shown in FIG. 2.
FIG. 3B is a side plan view of the electrolysis cell.
FIG. 3C is an end view of the electrolysis cell.
FIG. 6A is a perspective view of a solid inner core of the cell.
FIG. 6B is an end view of the core.
FIG. 6C is a side plan view of the core.

DETAILED DESCRIPTION OF ILLUSTRATIVE EMBODIMENTS

An aspect of the present disclosure is directed to a method and apparatus for electrolyzing liquids.

1. Electrolysis Cells

An electrolysis cell includes any fluid treatment cell that is adapted to apply an electric field across the fluid between at least one anode electrode and at least one cathode electrode. An electrolysis cell can have any suitable number of electrodes, any suitable number of chambers for containing the fluid, and any suitable number of fluid inputs and fluid outputs. The cell can be adapted to treat any fluid (such as a liquid or gas-liquid combination). The cell can include one or more ion-selective membranes between the anode and cathode or can be configured without any ion selective membranes.

Electrolysis cells can be used in a variety of different applications and housed in a variety of different types of apparatus, which can be hand-held, mobile, immobile, wall-mounted, free-standing, a motorized or non-motorized cleaning/sanitizing vehicle, wheeled, etc, for example. Non-limiting examples of different applications in which the electrolysis cells disclosed herein can be used are described in Field et al. U.S. Patent Publication No. 2007/0186368, published Aug. 16, 2007.

2. Electrolysis Cell Having a Membrane

Figure 1:
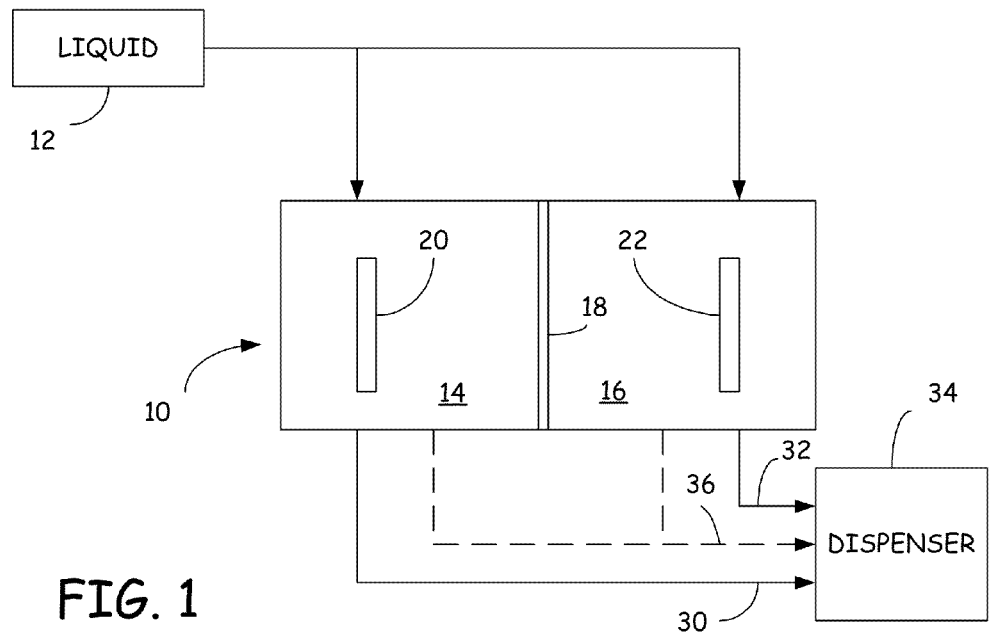
FIG. 1 illustrates an example of an electrolysis cell having an ion-selective membrane.

FIG. 1 is a schematic diagram illustrating an example of an electrolysis cell 10, which receives liquid to be treated from a liquid source 12. Liquid source 12 can include a tank or other solution reservoir or can include a fitting or other inlet for receiving a liquid from an external source.

Cell 10 has one or more anode chambers 14 and one or more cathode chambers 16 (known as reaction chambers), which are separated by an ion exchange membrane 18, such as a cation or anion exchange membrane. One or more anode electrodes 20 and cathode electrodes 22 (one of each electrode shown) are disposed in each anode chamber 14 and each cathode chamber 16, respectively. The anode and cathode electrodes 20, 22 can be made from any suitable material, such as a conductive polymer, titanium and/or titanium coated with a precious metal, such as platinum, or any other suitable electrode material. The electrodes and respective chambers can have any suitable shape and construction. For example, the electrodes can be flat plates, coaxial plates, rods, or a combination thereof. Each electrode can have, for example, a solid construction or can have one or more apertures. In one example, each electrode is formed as a mesh. In addition, multiple cells 10 can be coupled in series or in parallel with one another, for example.

The electrodes 20, 22 are electrically connected to opposite terminals of a conventional power supply (not shown). Ion exchange membrane 18 is located between electrodes 20 and 22. The power supply can provide a constant DC output voltage, a pulsed or otherwise modulated DC output voltage, and/or a pulsed or otherwise modulated AC output voltage to the anode and cathode electrodes. The power supply can have any suitable output voltage level, current level, duty cycle or waveform.

For example in one embodiment, the power supply applies the voltage supplied to the plates at a relative steady state. The power supply includes a DC/DC converter that uses a pulse-width modulation (PWM) control scheme to control voltage and current output. Other types of power supplies can also be used, which can be pulsed or not pulsed and at other voltage and power ranges. The parameters are application-specific.

During operation, feed water (or other liquid to be treated) is supplied from source 12 to both anode chamber 14 and cathode chamber 16. In the case of a cation exchange membrane, upon application of a DC voltage potential across anode 20 and cathode 22, such as a voltage in a range of about 5 Volts (V) to about 25V, cations originally present in the anode chamber 14 move across the ion-exchange membrane 18 towards cathode 22 while anions in anode chamber 14 move towards anode 20. However, anions present in cathode chamber 16 are not able to pass through the cation-exchange membrane, and therefore remain confined within cathode chamber 16.

As a result, cell 10 electrochemically activates the feed water by at least partially utilizing electrolysis and produces electrochemically-activated water in the form of an acidic anolyte composition 30 and a basic catholyte composition 32.

If desired, the anolyte and catholyte can be generated in different ratios to one another through modifications to the structure of the electrolysis cell, for example. For example, the cell can be configured to produce a greater volume of catholyte than anolyte if the primary function of the EA water is cleaning. Alternatively, for example, the cell can be configured to produce a greater volume of anolyte than catholyte if the primary function of the EA water is sanitizing. Also, the concentrations of reactive species in each can be varied.

For example, the cell can have a 3:2 ratio of cathode plates to anode plates for producing a greater volume of catholyte than anolyte. Each cathode plate is separated from a respective anode plate by a respective ion exchange membrane. Thus, there are three cathode chambers for two anode chambers. This configuration produces roughly 60% catholyte to 40% anolyte. Other ratios can also be used.

As mentioned above, the ion exchange membrane 18 can include a cation exchange membrane (i.e., a proton exchange membrane) or an anion exchange membrane. Suitable cation exchange membranes for membrane 18 include partially and fully fluorinated ionomers, polyaromatic ionomers, and combinations thereof. Examples of suitable commercially available ionomers for membrane 18 include sulfonated tetrafluorethylene copolymers available under the trademark "NAFION" from E.I. du Pont de Nemours and Company, Wilmington, Del.; perfluorinated carboxylic acid ionomers available under the trademark "FLEMION" from Asahi Glass Co., Ltd., Japan; perfluorinated sulfonic acid ionomers available under the trademark "ACIPLEX" Aciplex from Asahi Chemical Industries Co. Ltd., Japan; and combinations thereof. However, any ion exchange membrane can be used in other examples.

The anolyte and catholyte EA liquid outputs can be coupled to a dispenser 34, which can include any type of dispenser or dispensers, such as an outlet, fitting, spigot, spray head/nozzle, a cleaning/sanitizing tool or head, etc. There can be a dispenser for each output 30 and 32 or a combined dispenser for both outputs.

In one example, the anolyte and catholyte outputs are blended into a common output stream 36, which is supplied to dispenser 34. As described in Field et al. U.S. Patent Publication No. 2007/0186368, it has been found that the anolyte and catholyte can be blended together within the distribution system of a cleaning apparatus and/or on the surface or item being cleaned while at least temporarily retaining beneficial cleaning and/or sanitizing properties. Although the anolyte and catholyte are blended, they are initially not in equilibrium and therefore temporarily retain their enhanced cleaning and/or sanitizing properties.

3. Electrode Pattern Examples

In one example, at least one of the anode or cathode electrodes is formed of a metallic mesh, with regular-sized rectangular openings in the form of a grid. In one specific example, the mesh is formed of 0.023-inch diameter T316 stainless steel having a grid pattern of 20×20 grid openings per square inch. However, other dimensions, arrangements and materials can be used in other examples.

For example, as mentioned above, at least one of the anode or cathode electrodes can be formed at least partially or wholly of a conductive polymer, such as those used for static dissipating devices. Examples of suitable conductive polymers are commercially available from RTP Company of Winona, Minn., USA. For example, the electrodes can be formed of a conductive plastic compound having a surface resistivity of $10^0$ to $10^{12}$ ohm/sq, such as $10^1$ to $10^6$ ohm/sq. However, electrodes having surface resistivities outside those ranges can be used in other examples. One or more of the electrodes can form a mesh, with regular-sized rectangular openings in the form of a grid. However, the openings or apertures can have any shape, such as circular, triangular, curvilinear, rectilinear, regular and/or irregular. Curvilinear apertures have at least one curved edge. When injection molded, for example, the shapes and sizes of the apertures can be easily tailored to a particular pattern. However, these patterns can also be formed in metallic electrodes in other examples of the present disclosure.

The apertures can be sized and positioned to increase the surface area of the electrode for electrolysis and thereby promote generation of gas bubbles in the liquid being treated.

4. Tubular Electrode Example

Figure 2:
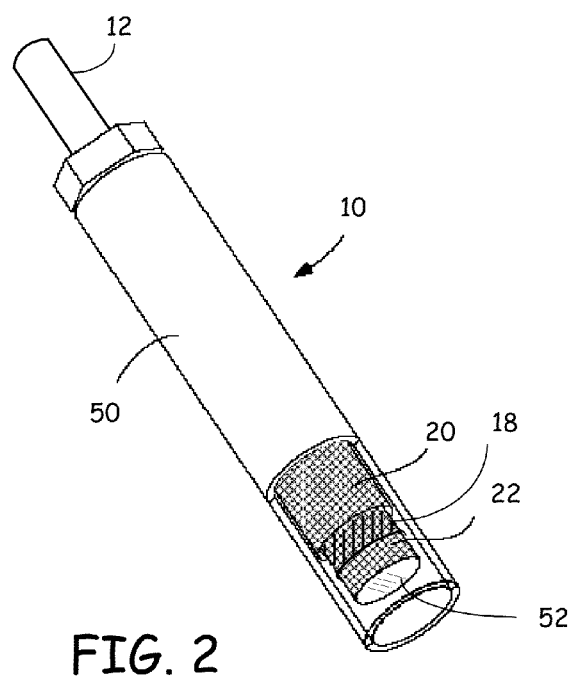
FIG. 2 illustrates an example of an electrolysis cell having a tubular shape according to one illustrative example.

The electrodes themselves can have any suitable shape, such as planar, coaxial plates, cylindrical rods, or a combination thereof. FIG. 2 illustrates an example of electrolysis cell 10 having a tubular shape according to one illustrative example. The radial cross-section of cell 10 can have any shape, such as circular as shown in FIG. 2, or other shapes such as curvilinear shapes having one or more curved edges and/or rectilinear shapes. Specific examples include ovals, polygons, such as rectangles, etc.

Portions of cell 10 are cut away for illustration purposes. In this example, cell 10 has a tubular housing 50, a tubular outer electrode 20, and a tubular inner electrode 22, which is separated from the outer electrode by a suitable gap, such as about 0.040 inches. Other gap sizes can also be used, such as but not limited to gaps in the range of 0.020 inches to 0.080 inches. Either of the inner or outer electrode can serve as the anode/cathode, depending upon the relative polarities of the applied voltages.

Ion-selective membrane 18 is positioned between the outer and inner electrodes 20 and 22. In one specific example, the ion-selective membrane includes a "NAFION" from E.I. du Pont de Nemours and Company, which has been cut to 2.55 inches by 2.55 inches and then wrapped around inner tubular electrode 22 and secured at the seam overlap with a contact adhesive, for example, such as a #1357 adhesive from 3M Company. Again, other dimensions and materials can be used in other examples.

In the example shown in FIG. 2, at least a portion of the volume of space within the interior of inner tubular electrode 22 is blocked by a solid insert 52 to promote liquid flow along and between electrodes 20 and 22 and ion-selective membrane 18, in a direction along the longitudinal axis of housing 50. This liquid flow is conductive and completes an electrical circuit between the two electrodes. Electrolysis cell 10 can have any suitable dimensions. In one example, cell 10 can have a length of about 4 inches long and an outer diameter of about one inch. The length and diameter can be selected to control the treatment time and the quantity of bubbles, e.g., nanobubbles and/or microbubbles, generated per unit volume of the liquid.

Cell 10 is connected to a liquid source 12, which in this example includes an inlet tube. Cell 10 can include a suitable fitting at one or both ends of the cell. Any method of attachment can be used, such as through plastic quick-connect fittings.

In the example shown in FIG. 2, cell 10 produces anolyte EA liquid in the anode chamber (between one of the electrodes 20 and 22 and ion-selective membrane 18) and catholyte EA liquid in the cathode chamber (between the other of the electrodes 20 and 22 and ion-selective membrane 18). The anolyte and catholyte EA liquid flow paths join at the outlet of cell 10 as the anolyte and catholyte EA liquids flow past the tubular end of ion-selective membrane 18 and out the end of cell 10. As a result, cell 10 produces and dispenses a blended anolyte and catholyte EA liquid.

5. Specific Example of an Electrolysis Cell

FIGS. 3-9 illustrate an electrolysis cell according to a specific example of the present disclosure. The same reference numerals are used in FIGS. 3-9 for the same or similar elements. The dimensions shown in the drawings are in inches and are provided as non-limiting examples only. Various other dimensions can be used in other examples.

FIG. 3A is a top plan view of electrolysis cell 10, FIG. 3B is a side plan view of electrolysis cell 10, and FIG. 3C is an end view of electrolysis cell 10. Electrolysis cell 10 includes a housing tube 50, and end caps 60 and 62. End caps 60, 62 are sealed at the ends of housing tube 50. As shown in FIG. 3C, end cap 62 has an opening 65 that forms either an inlet or outlet for the cell. Similarly end cap 60 has an opening 63 (shown in FIGS. 4A and 4B) that forms either an outlet or an inlet for the cell. Each opening 63, 65 has an ⅛ inch Normal Pipe Thread (NPT), for example, for attaching to the fitting of an inlet tube or outlet tube.

A first electrode contact 64 extends through end cap 60, and a second electrode contact 66 extends through a slot 67 in housing tube 50. Contact 64 is electrically coupled to outer electrode 20 (shown in FIGS. 4A and 4B), and contact 66 is electrically coupled to inner electrode 22 (also shown in FIGS. 5A and 5B). In one example, housing tube 50 and end caps 60, 62 are formed of ABS plastic.

Figure 4A:
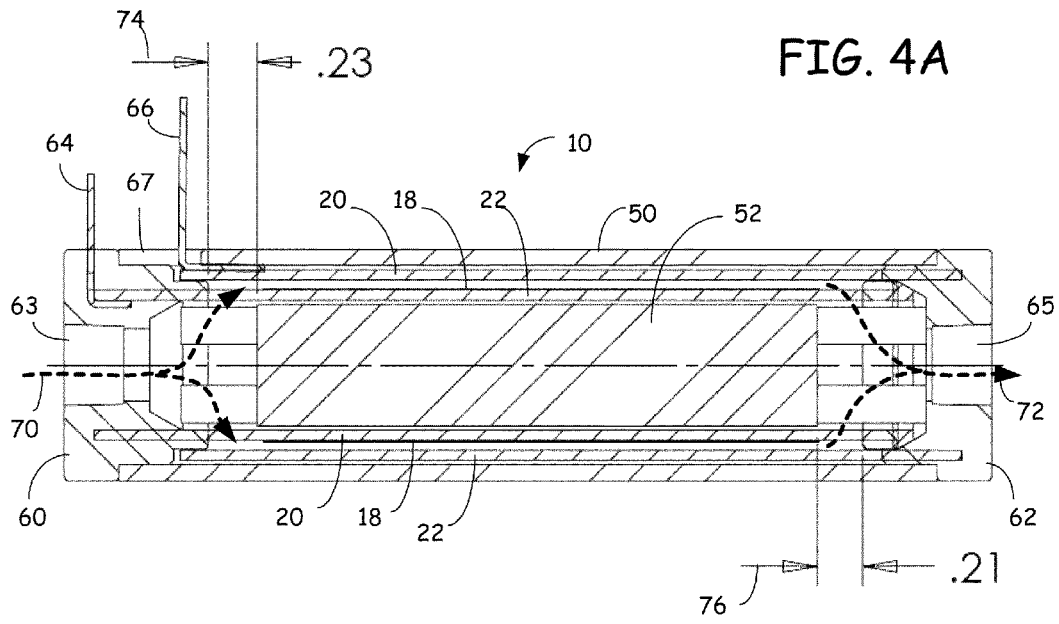
FIG. 4A is a sectional view of the cell taken along lines A-A of FIG. 3A.
Figure 4B:
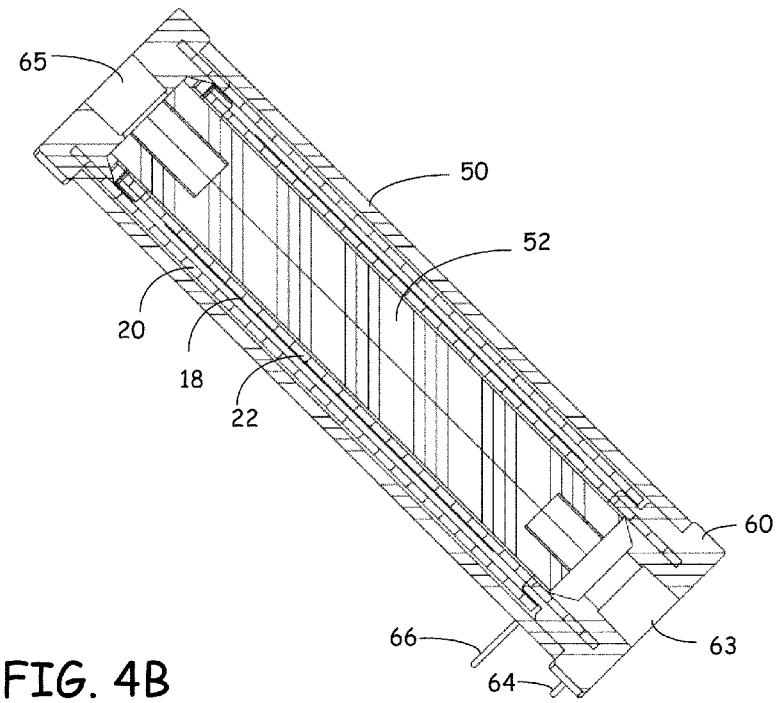
FIG. 4B is a sectional view of the cell taken along lines B-B of FIG. 3C.

FIG. 4A is a sectional view of cell 10 taken along lines A-A of FIG. 3A, and FIG. 4B is a sectional view of cell 10 taken along lines B-B of FIG. 3C. As discussed above, cell 10 includes a tubular housing 50, end caps 60, 62, inlet (or outlet) 63, outlet (or inlet) 65, outer electrode cylinder 20, ion-exchange membrane cylinder 18, inner electrode cylinder 22 and solid core insert 52. Contact 64 is attached to the inner diameter surface of inner electrode 22, and contact 66 is attached to the outer diameter surface of outer electrode 20. Slot 67 in housing tube 50 can be sealed around contact 66 with an epoxy, for example.

As described above with reference to FIG. 2, solid core insert 52 blocks at least a portion of the volume of space within the interior of inner electrode cylinder 22 to promote liquid flow along and between electrodes 20 and 22 and ion-selective membrane 18, as shown by inlet flow lines 70 and outlet flow lines 72 in FIG. 4A. Thus, the inner electrode 22 has a central longitudinal section and first and second end longitudinal sections, wherein the inlet flow path 70 and the outlet flow 72 path are fluidically coupled a volume of space within an interior of the first and second longitudinal sections, respectively, of inner electrode 22. At least a portion of a volume of space within an interior of the central longitudinal section is blocked to fluid flow along a longitudinal axis of the inner electrode 22 by solid inner core 52, such that the inlet flow path 70 and the outlet flow path 72 pass through the inner electrode 22 (as it is porous to fluid flow).

Ion-exchange membrane 18 has a length along the longitudinal axis of cell 10 that is shorter than the distance between end caps 60 and 62 to further promote liquid flow along and between electrodes 20 and 22 and ion-selective membrane 18. However, ion-exchange membrane 18 can have a length that is the same as or longer than the distance between end caps 60 and 62 in other examples. Arrows 74 illustrate a longitudinal gap (of approximately 0.23 inches, for example) between one end of ion exchange membrane 18 and the inner edge of end cap 60. Arrows 76 illustrate a longitudinal gap (of approximately 0.21 inches, for example) between the other end of ion exchange membrane 18 and the inner edge of end cap 62.

The inner and outer mesh electrodes 20 and 22 are porous to the liquid flow. The inlet flow 70 passes through inner mesh electrode 22, at longitudinal gap 74, and into the radial gap between electrodes 20 and 22. Similarly, the outlet flow 72 passes from the radial gap between electrodes 20 and 22, through inner mesh electrode 22 at longitudinal gap 76, to outlet 65.

Liquid also flows along a radial gap between the outer diameter surface of outer electrode 20 and the inner diameter surface of housing tube 50 and along a radial gap between the inner diameter surface of inner electrode 22 and the outer diameter surface of core insert 52. End caps 60 and 62 (and/or other standoff elements) have shoulders that form offsets for setting the gap spacing.

Figure 5E:
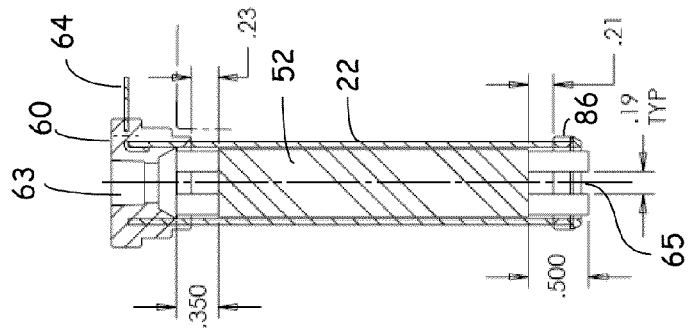
FIG. 5E is a sectional view of the cell taken along lines D-D of FIG. 5D.
Figure 5D:
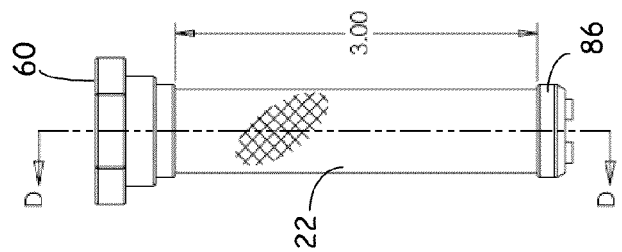
FIG. 5D illustrates the cell with the ion-selective membrane removed, exposing an inner electrode cylinder.
Figure 5C:
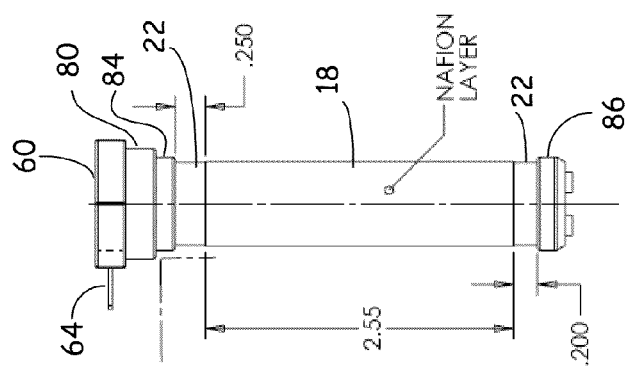
FIG. 5C illustrates the cell with the outer electrode and an end cap removed, exposing an ion-selective membrane.
Figure 5B:
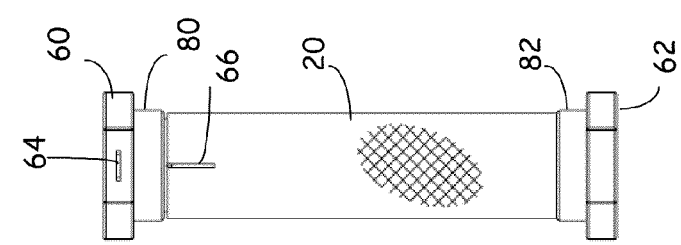
FIG. 5B illustrates the cell with a housing tube removed, exposing an outer electrode cylinder.
Figure 5A:
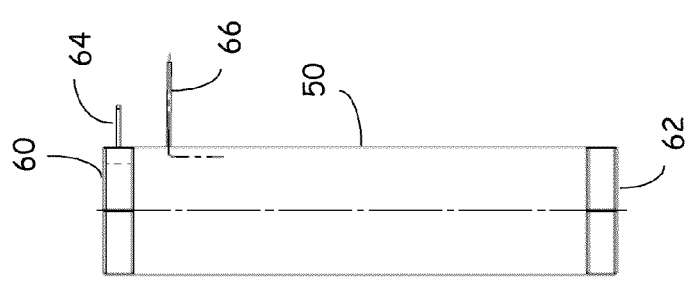
FIG. 5A illustrates the 10 in a final stage of assembly.

FIGS. 5A-5E show layers of electrolysis cell 10 in various assembly stages. FIG. 5A illustrates cell 10 in a final stage of assembly. FIG. 5B illustrates cell 10 with housing tube 50 removed, exposing outer electrode cylinder 20. End caps 60 and 62 have shoulders 80 and 82 on which housing tube 50 is mounted (in FIG. 5A) and which define the radial gap between housing tube 50 and outer electrode cylinder 20. FIG. 5B shows a portion of the mesh pattern of electrode 20.

FIG. 5C illustrates cell 10 with outer electrode 20 and end cap 62 removed, exposing ion-selective membrane 18. End cap 60 further includes shoulder 84 on which outer electrode 20 is mounted (in FIG. 5B) and which defines the radial gap between outer electrode 20 and ion-selective membrane 18. In addition, an offset ring 86 is molded onto or otherwise attached to inner electrode cylinder 22 to provide a similar a shoulder on the other end of cell 10 for mounting the outer electrode 20 (as shown in FIG. 5B). For example, offset 86 can have a cylindrical slot for receiving an end of inner electrode cylinder 22.

As shown in FIG. 5C, ion-exchange membrane 18 has a length along the longitudinal axis of cell 10 that is shorter than the distance between end cap 60 and offset 86, which exposes end portions of inner electrode cylinder 22 and promotes liquid flow along and between electrodes 20 and 22 and ion-selective membrane 18.

FIG. 5D illustrates cell 10 with ion-selective membrane 18 removed, exposing inner electrode cylinder 22.

FIG. 5E is a sectional view of cell 10 taken along lines D-D of FIG. 5D and illustrates the solid inner core 52 positioned within the interior of inner electrode cylinder 22. In one example, inner electrode cylinder fits within a cylindrical slot in end cap 60 and a similar slot in offset 86, which define a small radial gap between the inner diameter surface of inner electrode cylinder 22 and the outer diameter surface of solid inner core 52 to allow fluid flow along the gap, for example. The gap is not visible in FIG. 5E.

FIGS. 6A-6C illustrate solid inner core 52 in greater detail. FIG. 6A is a perspective view of core 52, FIG. 6B is an end view of core 52, and FIG. 6C is a side plan view of core 52. Each end of core 52 has a set of circumferentially-spaced slots 90 and interleaved legs 92. The legs 92 support end caps 60, 62 and offset 86, while slots 90 promote fluid flow through inlet/outlet 63 and inlet/outlet 65 and up into the gaps along and between the electrodes 20, 22. The slots also assist to merge the flow of the anolyte EA liquid produced in the anolyte chamber with the flow of the catholyte liquid produced in the catholyte chamber upon exit through the outlet of cell 10.

Figure 7A:
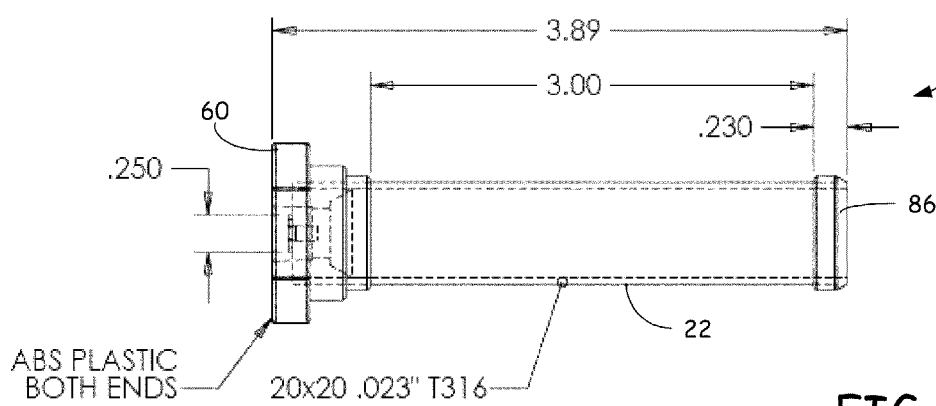
FIG. 7A is a top plan view of the cell, which illustrates features of the inner electrode cylinder as assembled with an end cap and offset.
Figure 7B:
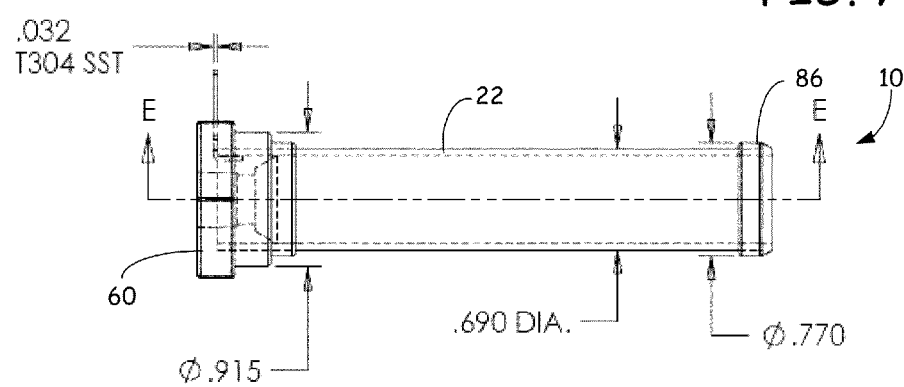
FIG. 7B is a side plan view of the cell as shown in FIG. 7A.
Figure 7C:
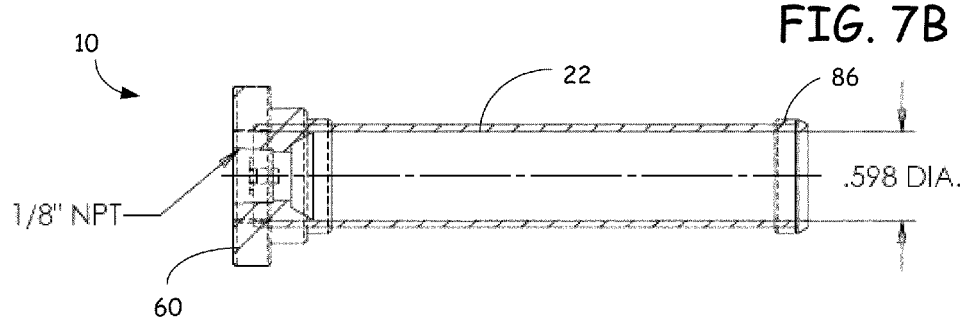
FIG. 7C is a sectional view of the cell taken along lines E-E of FIG. 7B.

FIGS. 7A-7C illustrate the features of inner electrode cylinder 22 as assembled with end cap 60 and offset 86 and show sample dimensions of various features. FIG. 7A is a top plan view of cell 10, FIG. 7B is a side plan view of cell 10, and FIG. 7C is a sectional view of cell 10 taken along lines E-E of FIG. 7B.

Figure 8A:
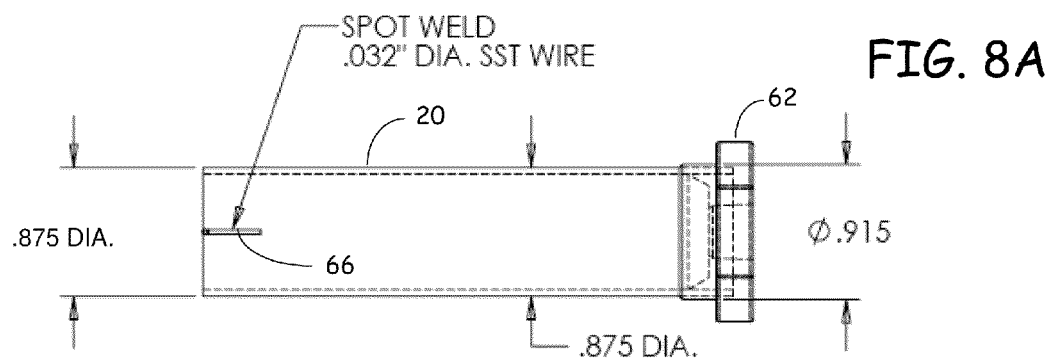
FIG. 8A is a top plan view of the cell, which illustrates features of the outer electrode cylinder as assembled with the end cap.
Figure 8B:
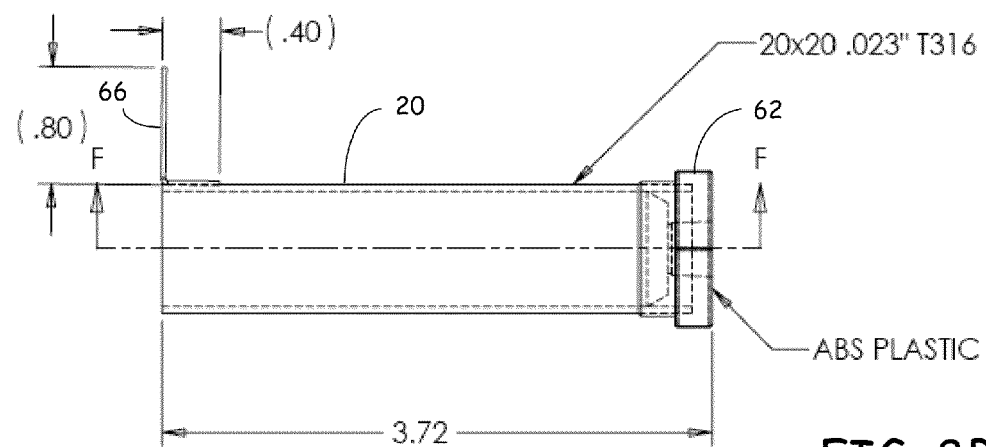
FIG. 8B is a side plan view of the cell as shown in FIG. 8A.
Figure 8C:
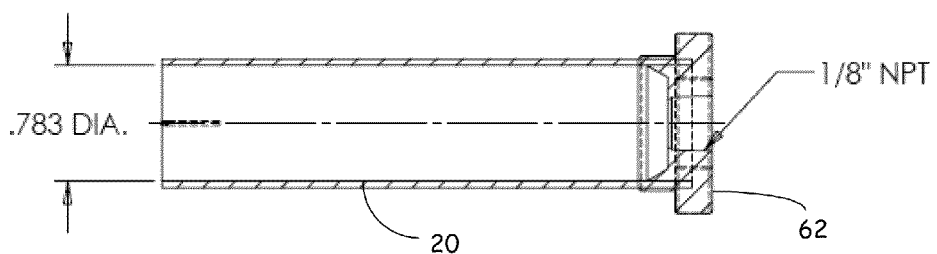
FIG. 8C is a sectional view of the cell taken along lines F-F of FIG. 8B.

Similarly, FIGS. 8A-8C illustrate the features of outer electrode cylinder 20 as assembled with end cap 62 and show sample dimensions of various features. FIG. 8A is a top plan view of cell 10, FIG. 8B is a side plan view of cell 10, and FIG. 8C is a sectional view of cell 10 taken along lines F-F of FIG. 8B.

Figure 9A:
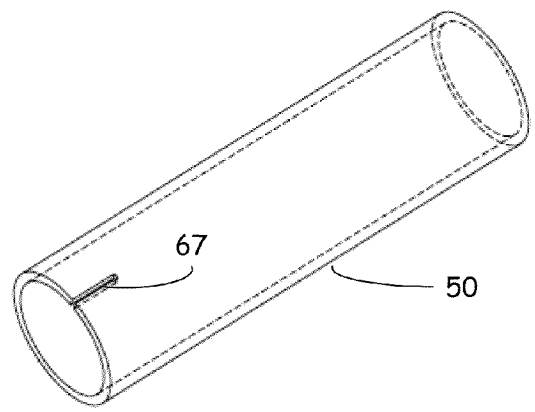
FIG. 9A is a perspective view of the housing tube 50.
Figure 9B:
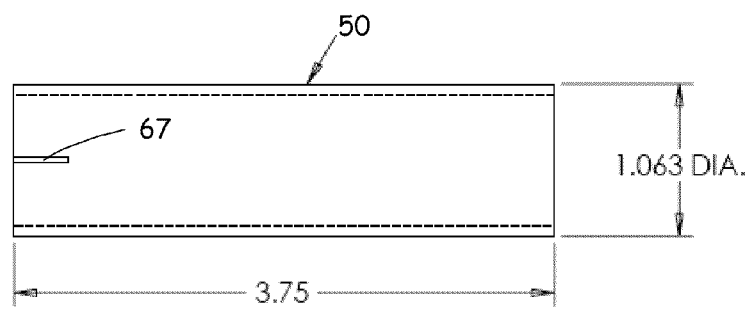
FIG. 9B is a top plan view of the housing tube.
Figure 9C:
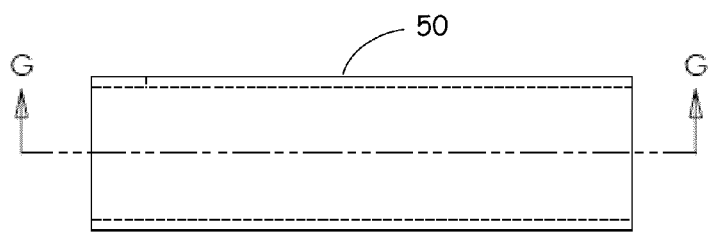
FIG. 9C is a side plan view of the housing tube.
Figure 9D:
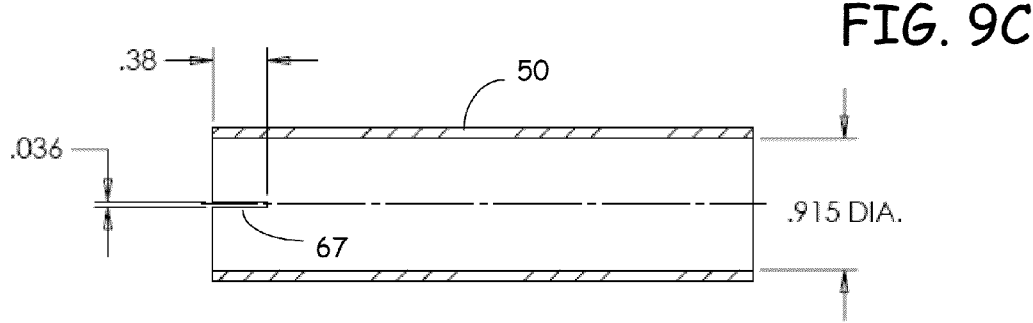
FIG. 9D is a sectional view of the housing tube taken along lines G-G of FIG. 9C.

FIGS. 9A-9D illustrate housing tube 50 in greater detail. FIG. 9A is a perspective view of tube 50, FIG. 9B is a top plan view of tube 50, FIG. 9C is a side plan view of tube 50, and FIG. 9D is a sectional view of tube 50 taken along lines G-G of FIG. 9C.

In the example shown above, the outer electrode 20, inner electrode 22 and ion-selective membrane 18 are cylindrical and substantially coaxial with one another. The ion-selective membrane 18 divides the cell into first and second reaction chambers, one between the outer electrode 20 and the ion-selective membrane 18 and another between the inner electrode 2 and the ion-selective membrane 18. Depending on the relative polarities of the voltages applied to the inner and outer electrodes, one chamber is an anode chamber and the other is a cathode chamber.

The anode and cathode chambers are fluidically coupled to one another at the inlet and outlet of the cell without any valves to switch a particular flow stream from one chamber to the other chamber.

In this particular example, the outer and inner electrodes 20, 22 are longer than the ion-selective membrane 18, with the ends of the outer and inner electrodes extending beyond both ends of the ion-selective membrane as shown in FIGS. 4A and 4B. This promotes the flows at each end of the anode chamber and cathode chamber to join one another, beyond the longitudinal edges of the membrane. Also, the electrodes and end caps are arranged to allow the joined flows to pass together from the cell inlet through the inner electrode and into the anode and cathode chambers, and to pass from the anode and cathode chambers together through the inner electrode to the cell outlet.

In an alternative example, the inner and outer electrodes and the ion-selective membrane have the same lengths, and the flows along the anode and cathode chambers join at the longitudinal edges of the electrodes and membrane. In a further example, the inlet and/or outlet to and from the cell is not located along the longitudinal axis of the cell. For example, the inlet and/or outlet can pass through the housing tube 50 or off-axis through an end cap. In a further example, the inlet and outlet can both be located at the same end of the cell. For example, the cell can have multiple, coaxial electrodes and ion-selective membranes that form multiple, coaxial chambers that are connected in series with one another to create a serpentine flow path. In yet a further example, the cell can include multiple, coaxial electrodes and ion-selective membranes that form multiple, coaxial anode and/or cathode chambers that are coupled in parallel with one another, with an inlet at one end and an outlet at the other end of the cell. In a further example, inner solid core 52 is removed and inner electrode cylinder 22 is formed as a solid cylinder or rod. In yet a further example, the anode and cathode chambers can have separate inlets and outlets to and from the cell. Other variations can also be used.

Although the present disclosure has been described with reference to one or more embodiments, workers skilled in the art will recognize that changes may be made in form and detail without departing from the spirit and scope of the disclosure and/or the appended claims.

What is claimed is:

1. An electrolysis cell comprising:
  an inlet and an outlet;
  coaxial, inner and outer electrodes; and
  a membrane located in a gap between the inner and outer electrodes and forming respective first and second electrolysis reaction chambers on opposing sides of the membrane, wherein fluid flow paths along the first and second chambers join together as a combined outlet flow path through the outlet, wherein at least a portion of a volume of space within an interior of the inner electrode is blocked to fluid flow along a longitudinal axis of the inner electrode, such that a combined inlet flow path is directed from the inlet to the first and second reaction chambers.

2. The electrolysis cell of claim 1, wherein the combined outlet flow path passes radially through the inner electrode.

3. The electrolysis cell of claim 1, wherein fluid flow paths along the first and second chambers join together as the combined inlet flow path through the inlet.

4. The electrolysis cell of claim 3, wherein the combined inlet flow path and the combined outlet flow path pass radially through the inner electrode.

5. The electrolysis cell of claim 4, wherein:
the inner electrode is porous to fluid flow;
the inner electrode comprises a central longitudinal section and first and second end longitudinal sections;
the inlet flow path and the outlet flow path are fluidically coupled to a volume of space within an interior of the first and second longitudinal sections, respectively; and
the portion of the volume of space blocked to fluid flow is blocked along the central longitudinal section, such that the inlet flow path and the outlet flow path pass radially through the inner electrode.

6. The electrolysis cell of claim 1 and further comprising a solid inner core located within the interior of the inner electrode, which blocks fluid flow through the solid inner core.

7. The electrolysis cell of claim 6, wherein:
the solid inner core is cylindrical and comprises first and second ends;
at least one of the first or second ends comprises a set of circumferentially-spaced slots and interleaved legs; and
the fluid flow paths pass through the sets of slots of the solid inner core.

8. The electrolysis cell of claim 1, wherein:
the membrane has a length along a longitudinal axis of the cell, which is shorter than lengths of the inner and outer electrodes.

9. The electrolysis cell of claim 8, wherein the inner and outer electrodes each have first and second opposite ends that extend beyond first and second opposite ends of the membrane to form third and fourth electrolysis chambers with no membrane between the inner and outer electrodes, at longitudinally-opposed ends of the first and second electrolysis chambers.

10. The electrolysis cell of claim 1, wherein at least one of the inner electrode, outer electrode or ion-selective membrane is cylindrical.

11. The electrolysis cell of claim 1 and further comprising:
a first end cap in which the inlet is formed; and
a second end cap in which the outlet is formed, wherein the first and second end caps support the inner and outer electrodes at a desired axial spacing from one another.

12. A method comprising:
a) passing a liquid through an electrolysis cell comprising, an inlet, an outlet, coaxial inner and outer electrodes, and a membrane located in a gap between the inner and outer electrodes, which forms respective first and second electrolysis reaction chambers on opposing sides of the membrane, wherein fluid flow paths along the first and second chambers join together as a combined inlet flow path through the inlet and a combined outlet flow path through the outlet;
b) blocking at least a portion of a volume of space within an interior of the inner electrode to fluid flow along a longitudinal axis of the inner electrode, such that the combined inlet flow path is directed from the inlet to the first and second reaction chambers; and
c) applying an energization voltage between the inner and outer electrodes.

13. The electrolysis cell of claim 1, wherein the membrane comprises an ion exchange membrane.

14. An electrolysis cell comprising:
an inlet and an outlet;
coaxial, inner and outer electrodes; and
a membrane located in a gap between the inner and outer electrodes and forming respective first and second electrolysis reaction chambers on opposing sides of the membrane, wherein fluid flow paths along the first and second chambers join together as a combined outlet flow path through the outlet, and wherein the combined outlet flow path passes radially through the inner electrode.

15. The electrolysis cell of claim 14, wherein:
the inner electrode is porous to fluid flow;
the inner electrode comprises a central longitudinal section and first and second end longitudinal sections;
an inlet flow path through the inlet and the outlet flow path are fluidically coupled to a volume of space within an interior of the first and second longitudinal sections, respectively; and
at least a portion of a volume of space within an interior of the central longitudinal section is blocked to fluid flow along a longitudinal axis of the inner electrode, such that the inlet flow path and the outlet flow path pass radially through the inner electrode.

16. An electrolysis cell comprising:
an inlet and an outlet;
coaxial, inner and outer electrodes; and
a membrane located in a gap between the inner and outer electrodes and forming respective first and second electrolysis reaction chambers on opposing sides of the membrane, wherein fluid flow paths along the first and second chambers join together as a combined outlet flow path through the outlet, and wherein the membrane has a length along a longitudinal axis of the cell, which is shorter than lengths of the inner and outer electrodes.

* * * * *